(12) United States Patent
Kasuya et al.

(10) Patent No.: US 8,226,145 B2
(45) Date of Patent: Jul. 24, 2012

(54) BOARD FOR THE ATTACHMENT OF ELECTRONIC PARTS

(75) Inventors: Masahiro Kasuya, Kariya (JP); Hidetoshi Nagata, Kariya (JP); Masashi Tsukamoto, Kosai (JP)

(73) Assignees: Toyota Boshoku Kabushiki Kaisha, Aichi (JP); Yazaki Corporation, Tokyo (JP)

( * ) Notice: Subject to any disclaimer, the term of this patent is extended or adjusted under 35 U.S.C. 154(b) by 424 days.

(21) Appl. No.: 12/512,327

(22) Filed: Jul. 30, 2009

(65) Prior Publication Data

US 2010/0027232 A1 Feb. 4, 2010

(30) Foreign Application Priority Data

Aug. 1, 2008 (JP) ................. 2008-200155

(51) Int. Cl.
B60R 7/04 (2006.01)
B60R 11/06 (2006.01)
A47C 31/00 (2006.01)
A47C 27/00 (2006.01)

(52) U.S. Cl. ................. 296/37.15; 297/217.3

(58) Field of Classification Search ........... 361/807, 361/808, 748, 747, 732, 740, 719, 720, 736, 361/749; 296/63, 68.1, 65.13, 37.14, 37.15, 296/65.09
See application file for complete search history.

(56) References Cited

U.S. PATENT DOCUMENTS

| | | | | |
|---|---|---|---|---|
| 5,742,480 A | * | 4/1998 | Sawada et al. | 361/749 |
| 5,872,194 A | * | 2/1999 | Isshiki et al. | 525/476 |
| 5,902,009 A | * | 5/1999 | Singh et al. | 297/188.1 |
| 5,958,176 A | * | 9/1999 | Isshiki et al. | 156/379.6 |
| 6,240,779 B1 | * | 6/2001 | Kung | 73/382 R |
| 6,386,612 B2 | * | 5/2002 | Hofmann et al. | 296/37.15 |
| 7,014,260 B2 | * | 3/2006 | Moriyama et al. | 297/15 |
| 7,182,382 B2 | * | 2/2007 | Harima et al. | 296/37.2 |
| 7,369,381 B2 | * | 5/2008 | Tsukamoto et al. | 174/72 A |
| 7,374,243 B2 | * | 5/2008 | Kayumi et al. | 297/335 |
| 7,419,205 B2 | * | 9/2008 | Tsukamoto | 296/65.03 |
| 7,696,614 B2 | * | 4/2010 | Fukusako et al. | 257/678 |
| 7,718,900 B2 | * | 5/2010 | Takaike | 174/254 |
| 2003/0137809 A1 | * | 7/2003 | Inoue et al. | 361/736 |
| 2004/0100115 A1 | * | 5/2004 | Rhodes et al. | 296/65.09 |
| 2004/0256877 A1 | | 12/2004 | Tromblee et al. | 296/68.1 |
| 2004/0262963 A1 | * | 12/2004 | Ali et al. | 297/217.3 |
| 2005/0167959 A1 | * | 8/2005 | Speckhart et al. | 280/735 |
| 2006/0076164 A1 | * | 4/2006 | Nishio | 177/136 |
| 2006/0290176 A1 | * | 12/2006 | Aoki | 297/180.1 |
| 2007/0107440 A1 | * | 5/2007 | Ito et al. | 62/3.2 |
| 2007/0182226 A1 | * | 8/2007 | Sakuma et al. | 297/217.3 |
| 2008/0088147 A1 | * | 4/2008 | Choi | 296/37.16 |
| 2008/0106873 A1 | * | 5/2008 | Okuya | 361/748 |
| 2008/0192443 A1 | * | 8/2008 | Hatanaka et al. | 361/728 |
| 2008/0269362 A1 | * | 10/2008 | Kuan et al. | 521/40 |
| 2009/0117346 A1 | * | 5/2009 | Nakahira | 428/195.1 |

FOREIGN PATENT DOCUMENTS

JP 10-203215 8/1998

\* cited by examiner

*Primary Examiner* — Lisa Lea Edmonds
*Assistant Examiner* — Xanthia C Cunningham
(74) *Attorney, Agent, or Firm* — Greenblum & Bernstein P.L.C.

(57) ABSTRACT

The present invention is a board for attachment of electronic parts to be assembled to a lower part of a seat. The board comprising a board body containing a resin. It is preferred that the board body includes vegetable fiber. It is preferred that the board body has a depressed portion formed therein for storing electronic parts. It is preferred that at least the depressed portion of the board body for storing a control board as the electronic parts has electric conductivity.

15 Claims, 8 Drawing Sheets

BOARD FOR THE ATTACHMENT OF ELECTRONIC PARTS

CROSS-REFERENCE TO RELATED APPLICATIONS

The present application claims priority under 35 U.S.C. §119 of Japanese Patent Application No. 2008-200155, filed on Aug. 1, 2008, the disclosure of which is expressly incorporated by reference herein in its entirety.

BACKGROUND OF THE INVENTION

1. Field of the Invention

The present invention relates to a board. The present invention, in more detail, relates to a board having outstanding strength and durability, the board allowing improvement in mounting workability of electronic parts to a lower part of a seat, and simultaneously enabling reduction in weight of attaching structures of the electronic parts in the lower part of a seat.

2. Description of the Related Art

Conventionally, a plurality of metal brackets are generally attached to a seat rail that constitutes the lower part of the seat, and then wire harnesses and control units as electronic parts are attached to each of these metal brackets in a predetermined order in vehicle seats for automobiles etc. (e.g., Related Art 1).

[Related Art 1] Japanese Patent Application Laid-Open No. H10-203215

However, the above-described conventional attaching structure of electronic parts provides excessive weight caused by direct attachment of electronic parts to a plurality of metal brackets. Especially, in order to secure electromagnetic shielding property, systems including the control boards in housings made of metals such as aluminum in place of housings made of resins are often used for control units as electronic parts. Such a system provides increased weight of the control unit itself and furthermore of the overall attaching structure of the electronic parts to the lower part of the seat.

In addition, it is necessary to attach the electronic parts to the lower part of the seat through an extremely limited space enclosed by seat rails, flames, metal brackets, various mechanism components, and already attached electronic parts. Therefore, longer working periods for the attachment and many numbers of parts are needed. Especially, in attachment of wire harnesses as electronic parts to the lower part of the seat, this harness has many penetrated arranging spots, and furthermore needs arranging within an extremely limited space, as described above. For this reason, extremely poor arranging workability will be presented, causing possible damage by involvement of wire harnesses, etc.

SUMMARY OF THE INVENTION

The present invention is completed in view of the present circumstances described above. An object of the present invention is to provide a board having outstanding strength and durability, the board allowing improvement in attachment workability of electronic parts to a lower part of a seat, and simultaneously enabling reduction in weight of the attaching structure of the electronic parts in the lower part of the seat.

In a non-limiting embodiment of the present invention, a board is provided. The board is for attachment of electronic parts to be assembled to a lower part of a seat. The board may include a board body containing a resin.

In other non-limiting embodiments, the board body may contain a vegetable fiber.

In further non-limiting embodiments, the board body may have a depressed portion formed in the board body for storing electronic parts.

In still other non-limiting embodiments, at least the depressed portion of the board body for storing a control board as the electronic parts may have electric conductivity.

In still further non-limiting embodiments, a contact portion that contacts a grounding pattern portion of the control board to be stored in the depressed portion may be formed in the depressed portion.

In yet even further non-limiting embodiments, the depressed portion may contain a vegetable fiber subjected to metal plating.

According to further non-limiting embodiments, the metal plating may be copper plating and nickel plating.

According to still other non-limiting embodiments, the board may further include a metal bracket which is attached to the board body and is connected to a seat rail that constitutes the seat.

In further non-limiting embodiments, the metal bracket may be attached to the board body so as to extend from one end to the other end of the board body.

In yet further non-limiting embodiments, the metal bracket may be provided with a locking portion that locks, by relative movement between the metal bracket and the seat rail, to a locked portion formed in the seat rail.

A board according to an aspect of the present invention allows preceding attachment of electronic parts to the board body, and then allows assembling of the board mounted with electronic parts into the lower part of the seat. This makes it possible to reduce working hours for attachment of electronic parts to the lower part of the seat, and the number of parts, thus providing higher attachment workability as compared with conventional attachment method in which the electronic parts are attached directly to metal brackets. Furthermore, the board comprises a board body containing a resin, and thus the board has outstanding strength and durability, while enabling reduction in weight of the attaching structure of the electronic parts in the lower part of the seat.

When the board body contains vegetable fibers, the attaching structure of the electronic parts can be further reduced in weight.

Here, when the board body has a depressed portion formed therein for receiving the electronic parts, the electronic parts can be simply and quickly attached to the board body. In this case, arranging workability of the wire harness as electronic parts is improved, and damage by involvement of the wire harness, etc. is also suppressed from occurring. Furthermore, the depressed portion can suppress occurrence of distortion and torsion, etc. of the board body, thereby further improving the strength and the durability of the board.

Here, when at least the depressed portion of the board body for receiving a control board as the electronic parts has electric conductivity, electromagnetic shielding property to the control board may be improved. The present invention does not need metal housings conventionally used to form the control unit, thus achieving further weight saving by the weight of the metal housings.

When the depressed portion has a contact portion that contacts a grounding pattern portion of the control board to be stored in the depressed portion, noises floating in the vicinity of the board body can be grounded from the control board through the wire harness.

When the depressed portion contains vegetable fibers subjected to metal plating, the attaching structure of the electronic parts may be further reduced in weight, and electromagnetic shielding property to the control board may further be improved.

When the metal plating is performed with copper plating and nickel plating, the depressed portion having outstanding electric conductivity and corrosion resistance is obtained.

When the board further has a metal bracket which is attached to the board body and is connected to a seat rail that constitutes the seat, the strength and the durability of the board can be further improved.

When the metal bracket is attached to the board body so that it may extend from one end to the other end of the board body, the strength and the durability of the board can be further improved.

When the metal bracket has a locking portion for locking, by relative movement between the metal bracket and the seat rail, to a locked portion formed in the seat rail, the locking portion of the metal bracket can be simply and quickly locked to the locked portion of the seat rail, thus enabling one-touch assembling of the board to the lower part of the seat.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Board

A board according to Embodiment 1 is a board for attachment of electronic parts to be assembled to the lower part of a seat, and characterized by comprising a board body to be described in the following paragraph. The board may further have, for example, a metal bracket to be described later.

Here, examples of the electronic parts include a control board, an air-conditioning fan, a body weight detection apparatus, a wire harness, and an electric wire. Examples of the control board include devices for controlling over one kind or two kinds or more of combination of a power seat, an air conditioning fan, a body weight detection apparatus, etc.

The structure, dimension, shape, material, number of pieces, etc. of the above-described "board body" are not particularly limited, as long as the board body contains a resin.

The resin is not particularly limited, and various resins may be used. The resin is usually a thermoplastic resin. However, a thermosetting resin may be used. Examples of the thermoplastic resin include: polyolefins (polypropylenes, polyethylenes, etc.); polyester resins, such as (aliphatic polyester resins, such as polylactic acids, polycaprolactones, and polybutylene succinates), and (aromatic polyester resins, such as polyethylene terephthalates, polybutylene terephthalates, and polytrimethylene terphthalates); polystyrenes; acrylic resins (resins obtained using methacrylates and/or acrylates, etc.); polyamide resins (nylons etc.); polycarbonate resins; polyacetal resin; and ABS resins. These resins may be used independently, or two or more of them may be used in combination.

Of these resins, at least one kind of polyolefins and polyester resins is preferred. Furthermore, of the polyolefins, polypropylenes are more preferred. Here, polylactic acid alloys may also be used as a polymer alloy. Of this polylactic acid alloys, a mixed resin of at least one kind of polystyrenes, ABS's, nylons, polycarbonates, polypropylenes, and polybutylene succinates, and polylactic acids are preferred.

Alternatively, of the polyester resins, polyester resins having biodegradability (hereinafter simply referred to as "biodegradable resin") are preferred. Examples of the biodegradable resins include: (1) homopolymers of hydroxycarboxylic acids, such as lactic acid, malic acid, glucose acid, and 3-hydroxybutyric acid, and hydroxycarboxylic acid aliphatic polyesters, such as copolymers using at least one kind of the hydroxycarboxylic acids, etc.; (2) caprolactone aliphatic polyesters, such as polycaprolactones, and copolymers of at least one kind of the hydroxycarboxylic acids and caprolactone; and (3) dibasic acid polyesters, such as polybutylene succinates, polyethylene succinates, and polybutylene adipates.

Of these polyester resins, polylactic acids, copolymers of lactic acid, and the hydroxycarboxylic acids excluding lactic acid; polycaprolactones; and copolymers of at least one kind of the hydroxycarboxylic acids and caprolactone are preferred. Polylactic acid is especially preferred.

These biodegradable resins may be used independently, or two or more of them may be used in combination.

Here, L-lactic acid and D-lactic acid shall be included in the lactic acid. These lactic acids may be used independently, or may be used in combination.

Although the above board body may principally include the above-described resins, vegetable fibers may be included in addition to the resins.

The vegetable fiber is a fiber originating in plants. The kind of the vegetable fiber is not particularly limited, but examples of the vegetable fiber include: fibers obtained from plants, such as Kenaf, Manila hemp, sisal hemp, jute hemp, cotton, ganpi, *Edgeworthia chrysantha*, paper mulberry, banana, pineapple, coconut palm, corn, sugarcane, bagasse, coconut, papyrus, reed, esparto, sabai grass, wheat, rice, bamboo, various needle-leaf trees (Japanese cedar, Japanese cypress, etc.) and broadleaf trees (regardless of woody and non-woody, furthermore regardless of sampling part). These vegetable fibers may be used independently, or two or more may be used in combination.

Of these vegetable fibers, fibers of kenaf, jute, and bagasse are preferred, because they have a smaller specific gravity and a higher growth speed and provide tough continuous fibers. Above all, fibers of kenaf having an especially high growth speed are more preferred, and especially bast of kenaf is preferred. The kenaf having a high growth speed provides a fiber with an especially high strength to specific gravity, and therefore provides the board body having a lightweight and a high-tensile strength.

Here, the kenaf is a rapidly growing therophyte plant having a cane, and is classified into Malvaceae. It includes *hibiscus cannabinus, hibiscus sabdariffa*, etc. as a scientific name, and furthermore, includes *apocynum venetum*, cuba kenaf, kenaf, thai kenaf, mesta, bimli, ambary hemp, bombay hemp, etc. as common name. In addition, jute represents a fiber obtained from jute hemp. The jute hemp shall include jute (*Corchorus capsularis L.*) and tsunaso jute, shima tsunaso (*Corchorus olitorius*), and plant of hemp and Tiliaceae including mulukhiya.

The dimension and shape of the vegetable fiber are not particularly limited, and usually, the fiber length is not less than 10 mm. The strength in this range easily provides effect of improving strength by inclusion of the vegetable fiber. The fiber length is preferably 10 to 150 mm, more preferably 20 to 100 mm, and especially preferably 30 to 80 mm. The fiber length represents a mean fiber length. This mean fiber length is a mean value measured by the direct method in which a single fiber is sampled randomly and measured for the fiber length on a scale for a total number of 200 of single fibers, based on JIS L 1015.

Furthermore, the fiber diameter is not more than 1 mm in general. The fiber diameter not more than 1 mm can give an especially high bending strength. The fiber diameter is preferably 0.01 to 1 mm, more preferably 0.05 to 0.7 mm, and especially preferably 0.07 to 0.5 mm. The fiber diameter is preferably 1 to 10 dtex. The fiber diameter represents a mean fiber diameter. This mean fiber diameter is a mean value obtained by a method, in which a single fiber is sampled randomly and measured for a fiber diameter in the center in a lengthwise direction of the fiber using an optical microscope for a total number of 200 of single fibers.

Although fibers of a form outside of the above range may be contained, the content is preferably not more than 10 mass % of the overall vegetable fibers.

The proportion of the resin and the vegetable fiber to be contained in the board body is usually not less than 30 mass % (in general not more than 95 mass %) to the overall mass of the board body. The proportion of the vegetable fiber is preferably 30 to 90 mass %, more preferably 35 to 85 mass %, especially preferably 40 to 80 mass %.

The method of manufacturing the board body containing the resin and the vegetable fiber is not particularly limited, and an injection molding process may be used. Alternatively, for example, the board may be produced by the following methods of (1) to (4).

(1): A thermoplastic resin is processed into a thermoplastic resin fiber. The obtained thermoplastic resin fiber and a vegetable fiber are combined together (simultaneous layering using an air layering method etc.) to form a mat-molded article. Then, the mat-molded article is heat-compressed to obtain a board body.

(2): A dispersion liquid obtained by dispersion of the thermoplastic resin (the dispersed state is not particularly limited, and emulsions, suspensions, etc. are included) is sprayed onto the vegetable fiber to obtain a resin-mixed fiber (may be dried by heating or other methods after spraying). The resin-mixed fiber is processed into a nonwoven fabric (layering by air layering method etc.) to obtain a mat-molded article. Then, the mat-molded article is heat-compressed to obtain a board body.

(3): A mat obtained by processing only the vegetable fiber into a nonwoven fabric (layering by air layering method etc.) is immersed into a dispersion liquid (the dispersed state is not particularly limited, and emulsions, suspensions, etc. are included) obtained by dispersion of the thermoplastic resin to form a mat-molded article (may be dried by heating or other methods after immersion). Then, the mat-molded article is heat-compressed to obtain a board body.

(4): A powdered thermoplastic resin is obtained by processing the thermoplastic resin into a shape of powder. The powdered thermoplastic resin and the vegetable fiber are mixed together. Then, the mixture is processed into a nonwoven fabric (layering by air layering method etc.) to obtain a mat-molded article. Then, the mat-molded article is heat-compressed to obtain a board body.

The above-described methods (1) to (4) may be used independently, or two or more may be used in combination. Of these methods, the method (1) is preferred in view of a simpler process at the time of mass production, a lower manufacturing cost, and a higher productivity.

In the method (1), any kind of method may be used in the fiber combining (fiber combining process) between the vegetable fiber and the thermoplastic resin fiber. For example, various methods, such as air layering, fleece processing, and carding may be used. These methods may be used independently, or two or more may be used in combination. Furthermore, an intermingle process of intermingling fibers may be performed after the fiber combining. The intermingle method in intermingle process is not particularly limited, and a needle punching method, a stitch bonding method, etc. may be used. These methods may be used independently, or two or more may be used in combination.

In the heat compression of the methods (1) to (4), heating and compressing may be performed simultaneously, or the compressing may be performed after heating. The heating temperature (temperature within the mat-molded article) and a compression pressure are not particularly limited, but the heating temperature is preferably 170 to 240° C. (preferably 190 to 220° C.) in use of polypropylenes and polylactic acids as the thermoplastic resin. The compression pressure is preferably 10 to 20 kgf/cm$^2$.

The board of Embodiment 1 may have, for example, a depressed portion formed therein for storing electronic parts. The structure, dimension, shape, material, number, etc. of this depressed portion are not particularly limited, but they are suitably selected based on the dimension, shape, number, etc. of the electronic parts to be stored. Examples of the form of this depressed portion, for example, include a combination of one or two or more of: (a) a box shaped form that includes a bottom wall, a peripheral wall that rises from the peripheral edge of the bottom wall, and an opening facing upward or downward; (b) a form including a passage portion with an opening facing upward or downward; etc.

Furthermore, the forms (a) and (b) preferably include a lid member for closing the opening of the upper part or lower part of the depressed portion, in order to avoid incoming of grid, dust, etc. into the depressed portion. This lid member, for example, may be made of the same material as that of the board body. In the form (a), the bottom wall preferably includes a rib portion formed by disposing a plurality of intersecting grooves (preferably intersecting approximately perpendicular to each other), in order to further improve the strength and the durability of the depressed portion and the board body.

Figure 2:
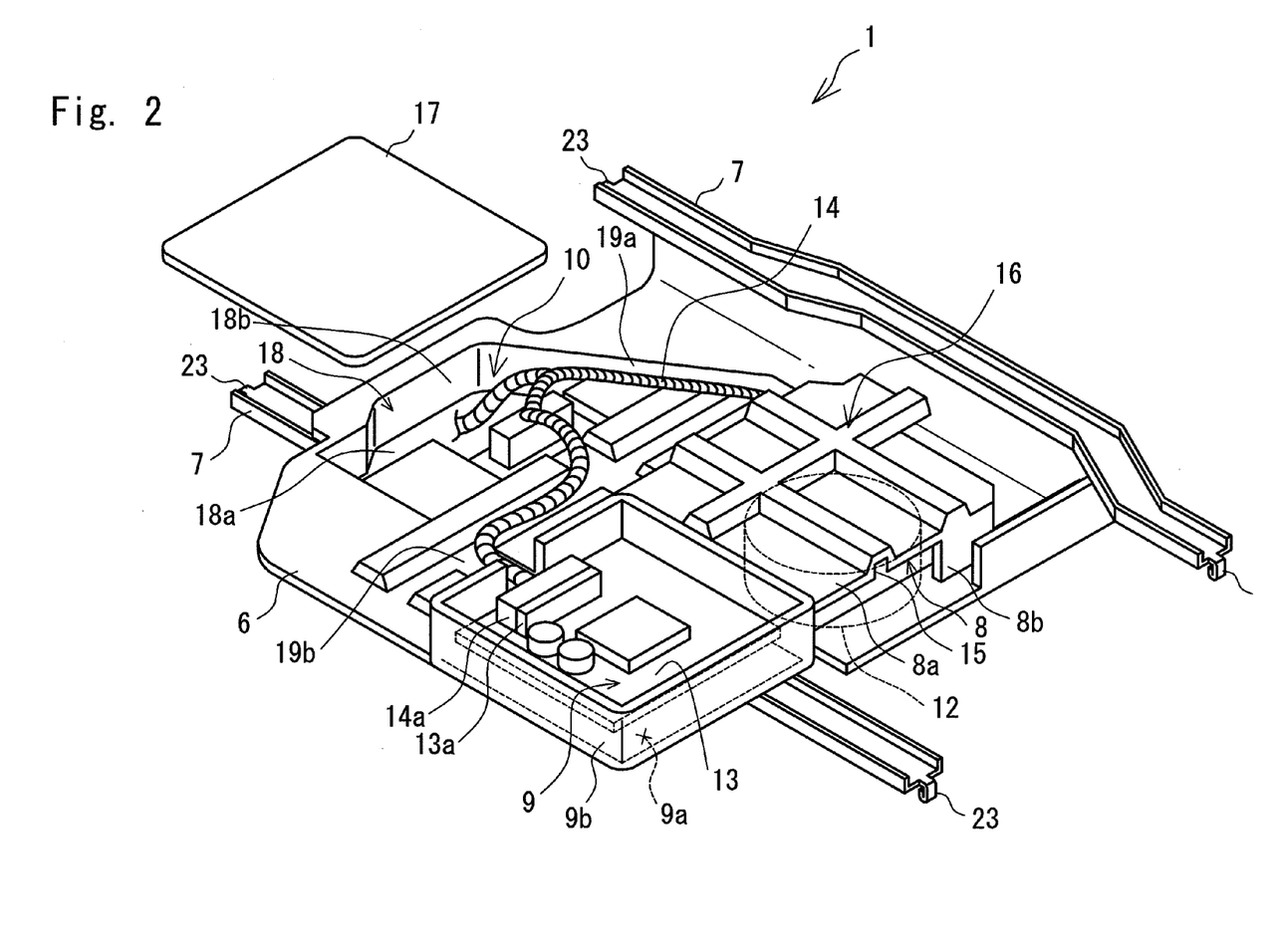
FIG. 2 is a perspective view showing a board according to an embodiment of the invention.
Figure 3:
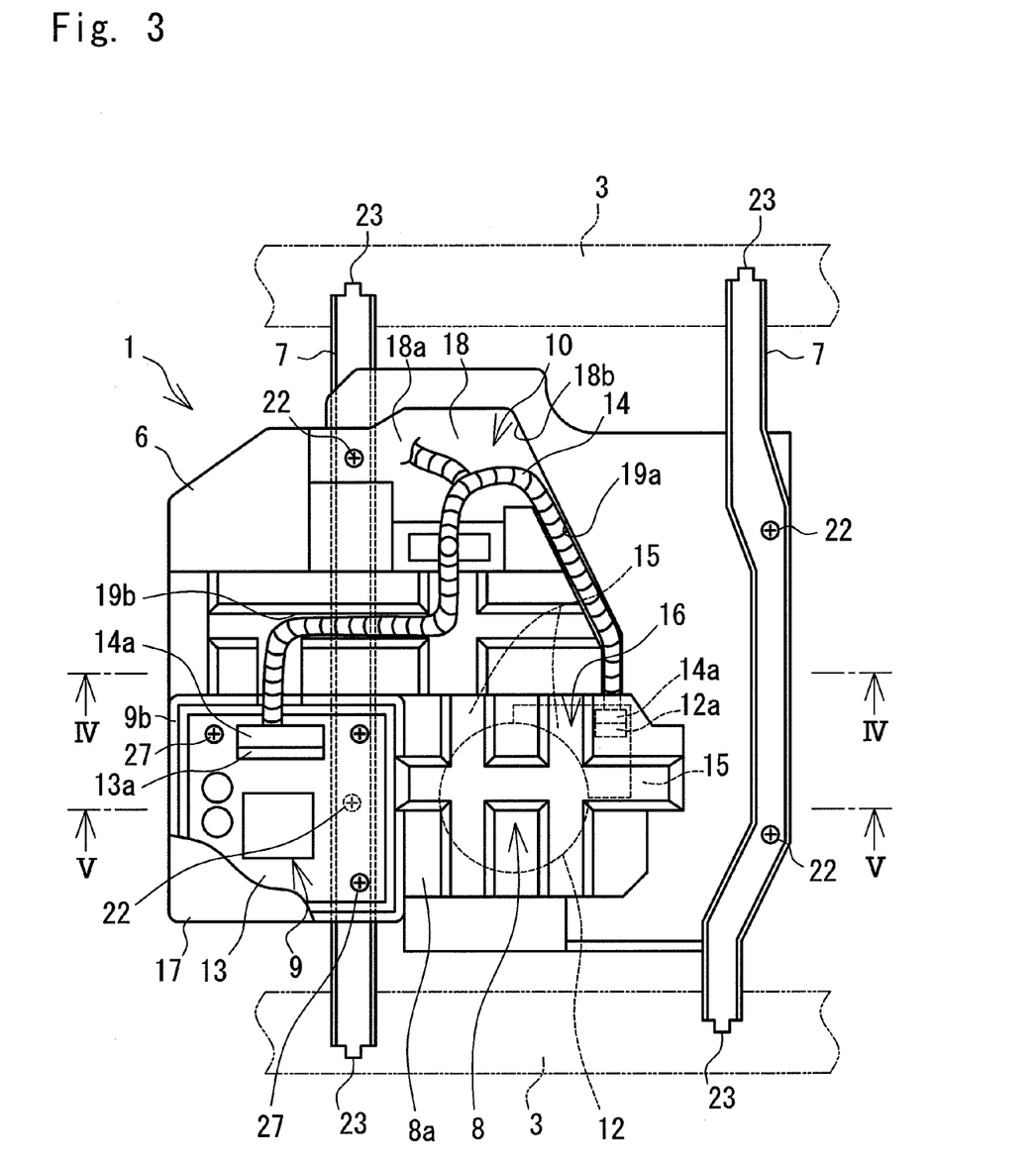
FIG. 3 is a plan view of the board.

Here, an example of the board of Embodiment 1, for example, include configuration that:

the board body comprises a first depressed portion for storing an air conditioning fan, a second depressed portion for storing a control board for controlling over the air conditioning fan, and a third depressed portion for storing a wire harness, wherein the first depressed portion is formed into a box shape, the first depressed portion including a bottom wall and a peripheral wall that rises from peripheral edges of the bottom wall, and an opening facing downward, the second depressed portion is formed into a box shape adjacent to the first depressed portion, the second depressed portion including a bottom wall and a peripheral wall that rises from peripheral edges of the bottom wall, and an opening facing upward, the third depressed portion includes a main depressed portion that has a bottom wall and a peripheral wall that rises from peripheral edges of the bottom wall, and is formed into a box shape having an opening facing upward; a passage portion for communication between the main depressed portion and the first depressed portion, the passage having an opening facing upward; and a passage portion for communication between the main depressed portion and the second depressed portion, the passage having an opening facing upward (refer to FIGS. 2 and 3). This configuration enables simpler and quicker attachment of an air conditioning fan, a control board, and a wire harness as electronic parts to the board body, and simultaneously, the first to the third depressed portions can suppress occurrence of distortion, twist, etc. of the board body, resulting in further improvement of the strength and the durability of the board. The ratio between the groove width of the passage portion and the diameter of the wire harness (groove width/diameter) may, for example, be 0.5 to 2 (preferably 0.8 to 1.25) in order to improve the arranging workability of the wire harness to the passage portion.

At least the depressed portion of the board body for storing the control board as electronic parts may be imparted with, for example, electric conductivity. From a viewpoint of improvement of electromagnetic shielding property for all the electronic parts mounted in the board body, the whole board body preferably has electric conductivity.

For example, a contact portion that contacts the grounding pattern portion of the control board to be stored in the depressed portion may be formed (refer to FIG. 5) in the depressed portion having electric conductivity.

When the board body includes a resin and a vegetable fiber as described above, for example, the vegetable fiber may have metal plating performed thereon. Thereby, the surface of the vegetable fiber has a metal plating layer formed thereon. The method of this metal plating is not particularly limited, and an electroplating method or hot-dip plating method may be used. However, electroless plating method is usually used. Here, the kind of metal plating is not particularly limited, but it includes plating with copper, nickel, gold, silver, tin, etc. Of these metals, copper and nickel are preferred.

The structure, dimension, shape, material, number, etc. of the "metal bracket" are not particularly limited, as long as it is attached to the board body, and is connected to the seat rail of the seat. The method of attaching the metal bracket to the board body is not particularly limited, but an example of the method includes attachment using screw thread, adhesion, clamping, etc.

The metal bracket may be attached to the board body, for example, so as to extend from one end to the other end of the board body. In this case, it is preferred that a plurality of metal brackets is disposed in parallel in order to further improve the strength and the durability of the board.

The metal bracket may be provided with a locking portion that locks, by relative movement between the metal bracket and the seat rail, to a locked portion formed in the seat rail. The kind of these locking portion and locked portion is not particularly limited, but one may be a hook that includes a base portion and a stopper portion connected to the base portion, and the other may be a hole portion that has a slit and an insertion opening connected to the slit (refer to FIGS. 6 and 7). Thereby, the base portion and the stopper portion of the hook are inserted into the insertion opening of the hole portion by abutting the metal bracket and the seat rail relative to each other, and then the metal bracket and the seat rail are moved with respect to a direction intersecting approximately perpendicularly to the abutting direction from the insertion state, and the base portion of the hook is moved in the slit of the hole portion. Thus, the movement of the metal bracket and the seat rail in the abutting direction will be restrained by interference of the peripheral edge side of the slit with the stopper portion.

2. Mounting Structure of Electronic Parts in the Lower Part of the Seat

The mounting structure of electronic parts in the lower part of the seat according to Embodiment 2 is a structure provided with the board of the Embodiment 1, characterized in that, the board is assembled to the lower part of the seat, and the electronic parts are attached to the board body constituting the board.

3. Method for attaching electronic parts to the lower part of the seat

The method for attaching electronic parts to the lower part of the seat according to Embodiment 3 is a method that uses the board of Embodiment 1, the method being characterized in that the electronic parts are attached to the board body that constitutes the board; and subsequently the board mounted with the electronic parts is assembled to the lower part of the seat.

EXAMPLES

Hereinafter, the present invention will be described in detail using examples, with reference to drawings.

(1) Structure of Board

Figure 1:
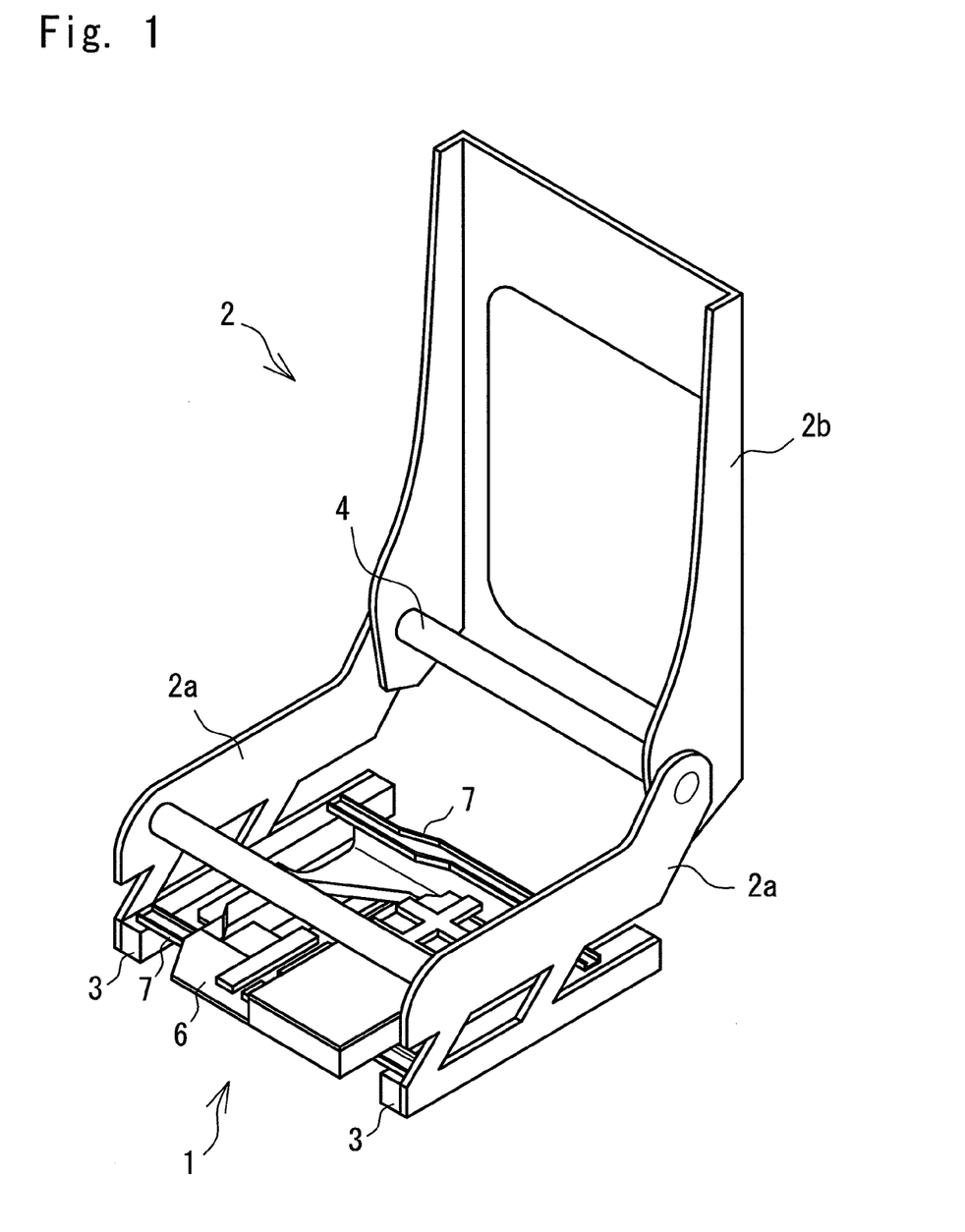
FIG. 1 is a perspective view showing a state of a board assembled to a vehicle seat according to an embodiment of the invention.

A vehicle seat 1 according to this example comprises right and left cushion frames 2a, and a side frame 2b supported through a shaft 4 at a rear side of each of the cushion frames 2a, as illustrated in FIG. 1. A pad made of a urethane resin and a skin cover made of a woven fabric, not illustrated, are stretched over the cushion frames 2a and the side frame 2b. Furthermore, the right and left upper seat rails 3 (exemplified as a "seat rail" according to the present invention) that are supported so as to be movable along the right and left lower seat rails (not illustrated) to be fixed to the floor is attached to the cushion frames 2a. The board 1 according to this example is attached to each of the upper seat rails 3.

As illustrated in FIGS. 2 and 3, the board 1 has an approximately rectangle plate-shaped board body 6, and a plurality of (2 in the Figure) metal brackets 7 to be attached to this the board body 6. The metal bracket has an approximately C-shaped longitudinal section. The lateral width (the width in the vertical direction in FIG. 3) of this board body 6 is set as a value smaller than an interval between the right and left upper seat rails 3. Furthermore, the length in a longitudinal direction of the metal bracket 7 is set as a value allowing attachment of each end of the metal bracket 7 to the right and left upper seat rails 3.

Here, the method for manufacturing the board body 6 will be described. First, a kenaf fiber obtained by giving copper plating and nickel plating by an electroless plating method to every single kenaf fiber was prepared. Then, this kenaf fiber (70 mm of fiber length) and a polypropylene fiber (51 mm of fiber length) were measured so as to give a mass ratio of 50:50. A mat-molded article having a 20 mm of layered thickness was obtained by mixing these fibers by the air layering method. The obtained mat-molded article was heat-compressed until the internal temperature of the mat-molded article reached 210° C. using a hot plate press machine heated to 250° C. to obtain a board-molded article having a 2.5 mm of board thickness. Subsequently, the obtained board-molded article was heated in an oven set at 250° C. to give a 210° C. of the internal temperature of the board-molded article. Next, the board-molded article was press-molded so as to give a pressure of approximately 12 kgf/cm$^2$ to give a predetermined a shape with depressions and projections using a metal mold having a temperature controlled at 40° C. Finally, unnecessary parts were cut off to obtain the board body 6.

Figure 4:
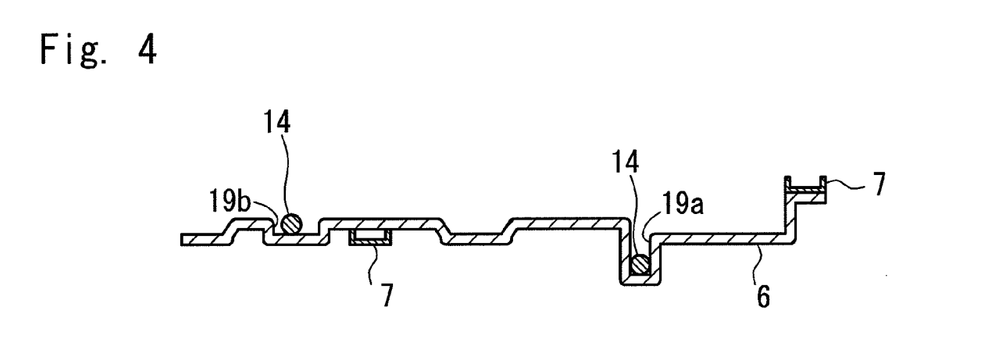
FIG. 4 is a cross-sectional view taken along IV-IV line of FIG. 3.

As illustrated in FIGS. 2 and 3, the board body 6 has a first depressed portion 8 for storing an air conditioning fan 12, a second depressed portion 9 for storing a control board 13 (control board of air conditioning fan), and a third depressed portion 10 for storing a wire harness 14 each formed therein. The first depressed portion 8 has a bottom wall 8a and a peripheral wall 8b that rises from a peripheral edge of the bottom wall 8a, and is formed into a box shape having an opening facing downward (refer to FIG. 5). A rib portion 16 having a plurality of grooves 15 intersecting perpendicular to each other is formed on a side, to which the air conditioning fan 12 is to be attached, of this bottom wall 8a. The second depressed portion 9 is provided adjacent to the first depressed portion 8. The second depressed portion 9 has a bottom wall 9a and a peripheral wall 9b that rises from the peripheral edge of the bottom wall 9a, and has an opening facing upward (refer to FIG. 5). A lid member 17 made of the same material as that for the board body 6 is attached to the second depressed portion 9 for closing the upper opening of the second depressed portion 9. The bottom wall 9a of the second depressed portion 9 has a contact portion 2b projecting upwards so as to contact with a grounding pattern portion 13b of the control board 13 to be stored in the second depressed portion 9 (refer to FIG. 5). The third depressed portion 10 includes a main depressed portion 18 that has a bottom wall 18a and a peripheral wall 18b that rises from the peripheral edge of the bottom wall 18a, and that is formed into a box shape having an opening facing upward, a passage portion 19a, having an opening facing upward, for connecting the main depressed portion 18 and the first depressed portion 8, and a passage portion 19b, having an opening facing upward, for connecting the main depressed portion 18 and the second depressed portion 9 (refer to FIG. 4). The passage widths of these passage portions 19a and 19b are set to approximately the same value as the diameter of the wire harness.

Figure 6:
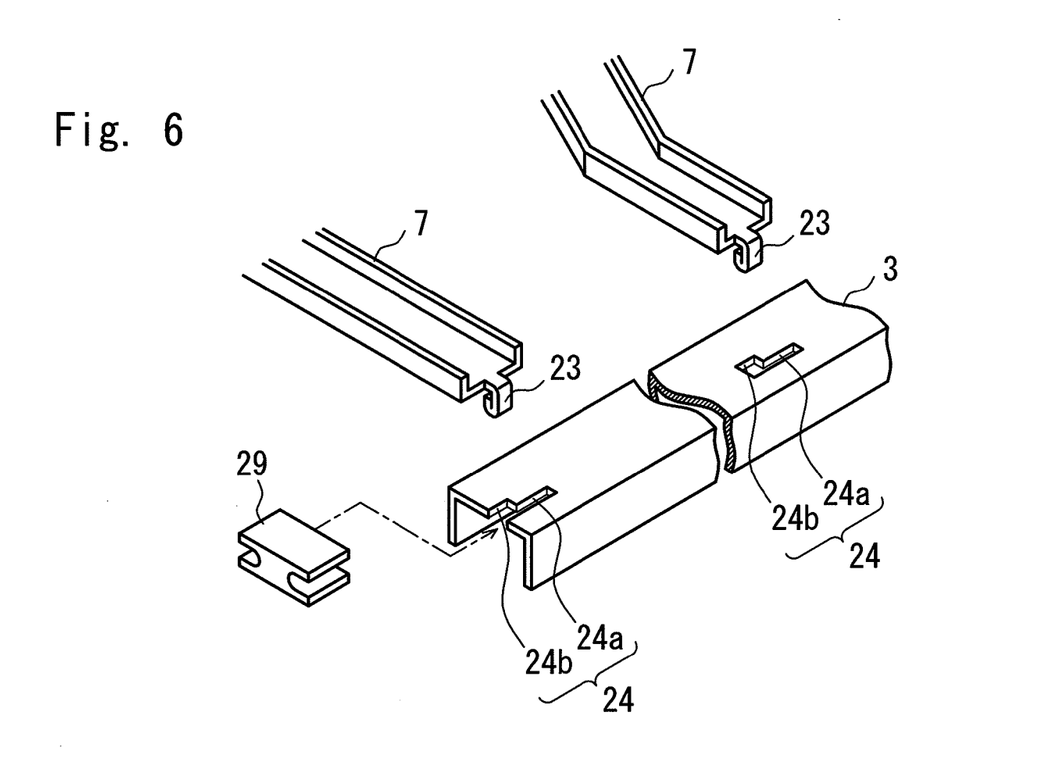
FIG. 6 is a perspective view showing a part of a metal bracket and upper seat rails according to an embodiment of the invention.
Figure 7:
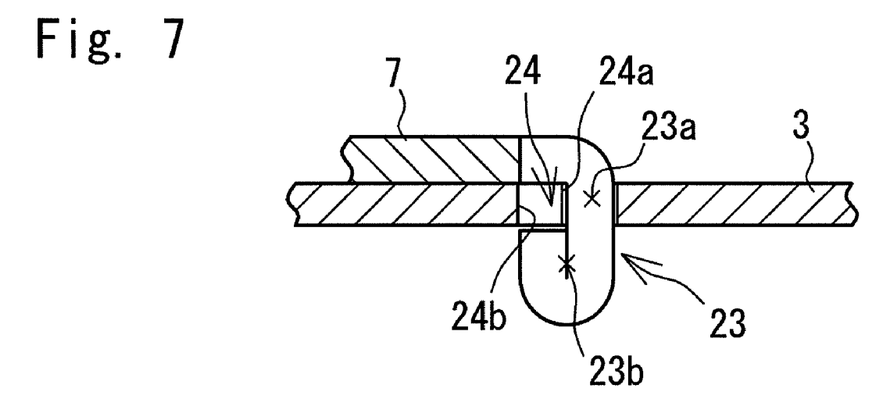
FIG. 7 is a vertical cross-sectional view showing a locked state of the metal bracket and the upper seat rail.

As illustrated in FIG. 3, the plurality of metal brackets 7 are attached in parallel so as to extend from one end to the other end of the board body 6 with a screw clamp 22. Both ends of each of the metal brackets 7 are projected from the side edge of the board body 6 in a side direction. As illustrated in FIGS. 6 and 7, a hook 23 (exemplified as a "locking portion" in the present invention), having one end being bent, is provided on both ends in a longitudinal direction of each of the metal brackets 7. This hook 23 has a base portion 23a, and a stopper portion 23b which is connected to this base portion 23a and has a larger width than that of the base portion 23a. Furthermore, a hole portion 24 is formed in an attaching section of the upper seat rail 3 for attaching the metal brackets 7. The hole portion 24 includes a slit 24a, and an insertion opening 24b which is connected to this slit 24a and a larger width than that of the slit 24a. The groove width of this slit 24a is set as a dimension that allows the movement of the base portion 23a of the hook 23 in a longitudinal direction of the slit 24a, and that does not allow the movement of the stopper portion 23b of the hook 23 in the vertical direction. Furthermore, the opening area of the insertion opening 24b is set as a dimension that allows insertion of the base portion 23a of the hook 23, and the stopper portion 23b in the vertical direction.

(2) Method for Attaching Electronic Parts to Vehicle Seat

Next, the method for attaching the electronic parts using the board 1 having the above structure will be described.

Figure 5:
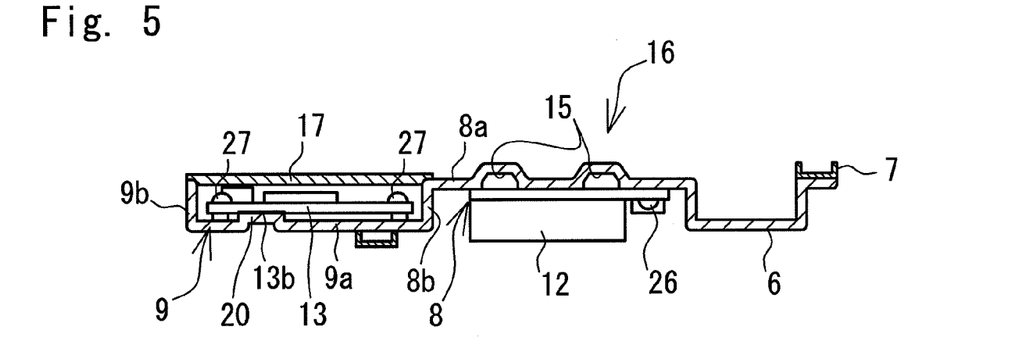
FIG. 5 is a cross-sectional view taken along V-V line of FIG. 3.

In the board body 6, the air conditioning fan 12 is stored in the first depressed portion 8, and is attached by a screw clamp 26 (refer to FIG. 5). The control board 13 is stored in the second depressed portion 9, and is attached by a screw clamp 27 (refer to FIG. 5). The wire harness 14 is arranged to the third depressed portion 10, and the connector portion 14a of the wire harness 14 is connected to the connector portions 12a and 13a of the air conditioning fan 12 and the control board 13, respectively (refer to FIGS. 2 and 3). The lid member 17 is fitted in the upper opening of the second depressed portion 9, and the control board 13 is rendered isolated from the exterior. In this way, the board 1 including various kinds of electronic parts mounted beforehand has been prepared.

Next, the metal bracket 7 of the board 1 obtained by mounting the electronic parts from above is abutted onto the upper surface of the upper seat rail 3 that constitutes the lower part of the vehicle seat 2, and the hook 23 of the metal bracket 7 is inserted into the insertion opening 24b of the hole portion 24 of the upper seat rail 3 (refer to FIG. 7). Then, in this inserted state, the metal bracket 7 is moved in the longitudinal direction of the slit 24a, and then the base portion 23a of the hook 23 is moved in the slit 24a of the hole portion 24. Then, interference between the peripheral edge side of the slit 24a and the stopper portion 23b can restrain the vertical movement of the metal bracket 7 with respect to the upper seat rail 3. Subsequently, in this restrained state, a rubber cap member 29 (refer to FIG. 6) is pressed into the upper seat rail 3 from an opening at one end in a longitudinal direction of the upper seat rail 3, and thereby horizontal movement of the metal bracket 7 with respect to the upper seat rail 3 will be restrained. As a result, the board 1 including the electronic parts mounted in the lower part of the vehicle seat 2 has been assembled.

(3) Effect of Example

According to this example, the board body 6 has the electronic parts attached beforehand, and then the board 1 mounted with the mounted electronic parts may be assembled to the lower part of the vehicle seat 2. This method can reduce working hours for attachment of electronic parts to the lower part of the vehicle seat 2 and the number of parts, and provide more improved attachment workability of the electronic parts, compared with the conventional case of directly attaching the electronic parts to metal brackets. The board body 6 including polypropylene and kenaf fiber achieves reduction in weight of the structure for attachment of the electronic parts in the lower part of the vehicle seat 2, and simultaneously can provide the board 1 that demonstrates outstanding strength and durability. Furthermore, simplification of the structure for attachment of the electronic parts in the lower part of the vehicle seat 2 can provide easier design for folding and storing of the vehicle seat.

Furthermore, in this example, the first depressed portion 8 for storing the air conditioning fan 12, the second depressed portion 9 for storing the control board 13, and the third depressed portion 10 for storing the wire harness 14 are formed in the board body 6, and thereby simpler and quicker attachment of the air conditioning fan 12, the control board 13, and the wire harness 14 to the board body 6 can be enabled. Especially, the arranging workability of the wire harness 14 is improved, and occurrence of damage by involvement of the wire harness 14, etc. is also suppressed. Furthermore, the first to the third depressed portions 8, 9, and 10 can suppress occurrence of distortion, twist, etc. of the board body 6, providing further improvement of the strength and the durability of the board 1.

In this example, since the rib portion 16 obtained by disposing a plurality of grooves 15 intersecting perpendicular to each other is formed in the bottom wall 8a constituting the first depressed portion 8, the strength and the durability of the first depressed portion 8 and also of the board 1 can be further improved.

Furthermore, in this example, outstanding electric conductivity and corrosion resistance are given to the board body 6 by providing the copper plating and nickel plating to the kenaf fiber that constitutes the board body 6, resulting in improvement in electromagnetic shielding property to the electronic parts (especially the control board 13) to be mounted in the board body 6. Thus, the conventional structure of the control unit using metal housings is not needed, thereby achieving further weight saving by the metal housings.

In this example, since the contact portion 20 that contacts the grounding pattern portion 13b of the control board 13 is formed in the second depressed portion 9, noises floating in the vicinity of the board body 6 may be grounded from the control board 13 through the wire harness 14.

In this example, the plurality of metal brackets 7 that are attached to the board body 6, and are connected to the upper seat rail 3 are further provided, and each of the metal brackets 7 is attached in parallel to the board body 6 so as to extend from one end to the other end of the board body 6, providing further improvement in strength and durability of the board 1.

In this example, the hook 23 having the base portion 23a and the stopper portion 23b is provided to both ends in a longitudinal direction of the metal bracket 7, and simultaneously the hole portion 24 having the slit 24a and the insertion opening 24b are provided in the attaching section of the upper seat rail 3 for attaching the metal brackets 7, and thereby the hook 23 of the metal bracket 7 and the hole portion 24 of the upper seat rail 3 can be locked simply and promptly by relative movement between the metal bracket 7 and the upper seat rail 3, enabling one-touch assembling of the board 1 to the lower part of the vehicle seat 2.

Furthermore, in this example, since the metal bracket 7 constituting the board 1 is attached to the upper seat rail 3 that moves in a forward and backward direction together with the vehicle seat 2, the limited space of the lower part of the vehicle seat 2 can be utilized effectively as a storing space for electronic parts.

Figure 8:
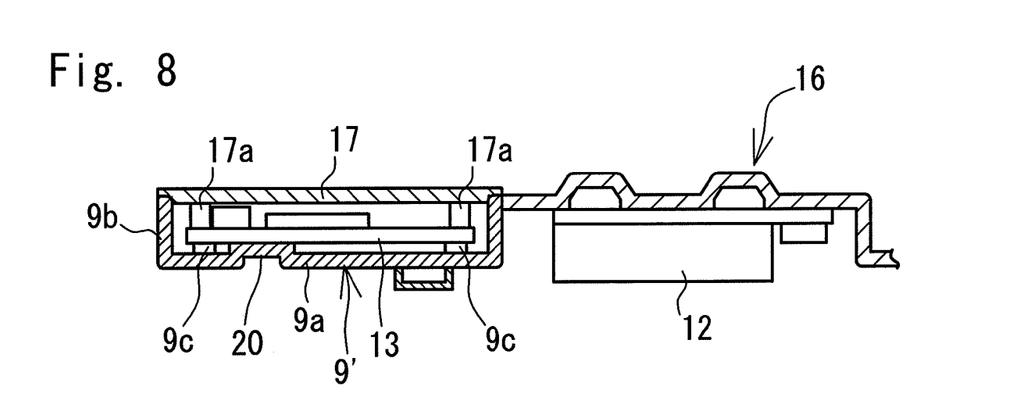
FIG. 8 is a vertical cross-sectional view for describing the board in other forms.

The present invention is not limited to the above-described examples, and various modifications will be possible within the scope of the present invention according to objects and applications. That is, in the example, although a whole of the board body 6 having electric conductivity has been described, the present invention is not limited to this example, and for example, as illustrated in FIG. 8, in the board body 6 the second depressed portion 9' only may have electric conductivity.

Furthermore, in the example, the bottom wall 8a that constitutes the first depressed portion 8 only has the rib portion 16, but the present invention is not limited to this example. For example, the peripheral wall 8b may also have the rib portion 16 in addition to the bottom wall 8a that constitutes the first depressed portion 8. With this, the strength and the durability of the board 1 can be further improved. Alternatively, the rib portion 16 may be provided in the bottom wall 9a and/or the peripheral wall 9b that constitute the second depressed portion 9, and the rib portion 16 may also be provided in the bottom wall 18a and/or the peripheral wall 18b that constitute the main depressed portion 18 of the third depressed portion 10.

In the example, although the control board 13 stored in the second depressed portion 9 is fixed by the screw clamp 27, the present invention is not limited to this example. For example, as illustrated in FIG. 8, the control board 13 may be fixed by sandwiching it between a projection 9c provided in the bottom wall 9a of the second depressed portion 9 and a projection 17a provided in the rear surface of the lid member 17.

In the example, one second depressed portion 9 for storing one control board 13 is formed in the board body 6, but the present invention is not limited to this example. For example, two or more depressed portions for storing respective two or more control boards may be formed in the board body, or one depressed portion for storing two or more control boards may also be formed in the board body.

In the example, the metal bracket 7 that constitutes the board 1 is attached to the upper seat rail 3, but the present invention is not limited to this example. For example, a metal bracket that constitutes the board may be attached to a lower seat rail disposed immovably to a vehicle floor.

In the example, although metal plating is performed to the kenaf fiber of the board body before molding, the present invention is not limited to this example, and for example, the metal plating may be performed to the board body after molding.

In the example, although two kinds of metal platings, copper plating and nickel plating, were performed to the kenaf fiber, the present invention is not limited to this example, and one kind or three kinds or more of metal platings may be performed.

In the example, although the board body 6 including the resin and the vegetable fiber is obtained by press molding, the present invention is not limited to this example. For example, the board body 6 including the resin and the vegetable fiber may be obtained by injection molding.

In the example, although whole of the board body 6 is obtained by an integral press molding, the present invention is not limited to this example. For example, the board body may be obtained by fixing these parts appropriately using fixing means (for example, welding, adhesion, screw thread, clamp, etc.), after press molding each of the plurality of parts (for example, depressed portion etc.) that constitute the board body 6.

Furthermore, in the example, although the plate-like board-molded article is molded by heat compression of the mat-molded article, and then the board body 6 shaped into a predetermined uneven shape is obtained by heat compression of the board-molded article, the present invention is not limited to this example. For example, the board body 6 shaped into a predetermined uneven shape may be obtained by one time of heat compression of the mat-molded article.

The present invention is widely utilized as a technique for attaching electronic parts to a lower part of the seat. Especially it is suitably used as technique for attaching electronic parts to the lower part of vehicle seats of automobiles, trains, and airplanes, etc.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A board for attachment of electronic parts to be assembled to a lower part of a seat, the board comprising:
    a board body containing a resin, the board body having an electronics depressed portion formed therein that stores electronic parts, the board body having a wire depressed portion formed therein that stores a wire harness, and the board body having a boxed-shaped depressed portion that is formed into a box shape that includes both a bottom wall and a peripheral wall that rises from a peripheral edge of the bottom wall,
    wherein at least the electronics depressed portion of the board body, that stores a control board as the electronic parts, is electrically conductive.

2. The board according to claim 1, wherein the board body contains a vegetable fiber.

3. The board according to claim 2, wherein a contact portion that contacts a grounding pattern portion of the control board is formed in the electronics depressed portion.

4. The board according to claim 3, wherein the electronics depressed portion contains a vegetable fiber subjected to metal plating.

5. The board according to claim 4, wherein the metal plating is copper plating and nickel plating.

6. The board according to claim 5, further comprising a metal bracket which is attached to the board body and is connected to a seat rail that constitutes the seat.

7. The board according to claim 6, wherein the metal bracket is attached to the board body so as to extend from one end to the other end of the board body.

8. The board according to claim 7, wherein the metal bracket is provided with a locking portion that locks, by relative movement between the metal bracket and the seat rail, to a locked portion formed in the seat rail.

9. The board according to claim 7, wherein the metal bracket is provided with a locking portion that locks, by relative movement between the metal bracket and the seat rail, to a locked portion formed in the seat rail.

10. The board according claim 2, further comprising a metal bracket which is attached to the board body and is connected to a seat rail that constitutes the seat.

11. The board according to claim 10, wherein the metal bracket is attached to the board body so as to extend from one end to the other end of the board body.

12. The board according to claim 11, wherein the metal bracket is provided with a locking portion that locks, by relative movement between the metal bracket and the seat rail, to a locked portion formed in the seat rail.

13. The board according to claim 10, wherein the metal bracket is provided with a locking portion that locks, by relative movement between the metal bracket and the seat rail, to a locked portion formed in the seat rail.

14. The board according to claim 1, wherein the electronics depressed portion contains a vegetable fiber subjected to metal plating.

15. The board according to claim 14, wherein the metal plating is copper plating and nickel plating.

* * * * *